United States Patent
Dwyer et al.

(10) Patent No.: US 7,212,676 B2
(45) Date of Patent: May 1, 2007

(54) MATCH MSB DIGITAL IMAGE COMPRESSION

(75) Inventors: Michael K. Dwyer, El Dorado Hills, CA (US); Thomas A. Piazza, Granite Bay, CA (US)

(73) Assignee: Intel Corporation, Santa Clara, CA (US)

(*) Notice: Subject to any disclaimer, the term of this patent is extended or adjusted under 35 U.S.C. 154(b) by 681 days.

(21) Appl. No.: 10/335,423

(22) Filed: Dec. 30, 2002

(65) Prior Publication Data
US 2004/0126032 A1 Jul. 1, 2004

(51) Int. Cl.
*G06K 9/36* (2006.01)
*G06K 9/46* (2006.01)
*G06K 9/38* (2006.01)

(52) U.S. Cl. .................. 382/233; 382/251; 382/244
(58) Field of Classification Search ............... 382/252
See application file for complete search history.

(56) References Cited

U.S. PATENT DOCUMENTS

| | | | | |
|---|---|---|---|---|
| 4,646,148 A * | 2/1987 | Lienard et al. | ........ | 375/240.12 |
| 5,287,200 A * | 2/1994 | Sullivan et al. | ............ | 382/251 |
| 5,903,673 A * | 5/1999 | Wang et al. | ................ | 382/236 |
| 6,040,864 A * | 3/2000 | Etoh | ..................... | 375/240.16 |
| 6,205,254 B1 * | 3/2001 | Koshi et al. | ................. | 382/239 |
| 6,301,299 B1 | 10/2001 | Sita et al. | | |
| 6,310,977 B1 | 10/2001 | Persiantsev | | |
| 6,334,001 B2 * | 12/2001 | de Queiroz et al. | ........ | 382/233 |
| 6,748,116 B1 * | 6/2004 | Yue | ............................. | 382/238 |
| 6,757,435 B2 * | 6/2004 | Kondo | ....................... | 382/238 |
| 6,950,469 B2 * | 9/2005 | Karczewicz et al. | ... | 375/240.17 |
| 6,983,075 B2 * | 1/2006 | Schwartz et al. | ........... | 382/251 |

FOREIGN PATENT DOCUMENTS

EP 0 639 920 A1 2/1995

* cited by examiner

*Primary Examiner*—Wenpeng Chen
*Assistant Examiner*—Yuzhen Ge
(74) *Attorney, Agent, or Firm*—Ram P. Yadav

(57) ABSTRACT

Methods, apparatus and computer readable medium are described that compress and/or decompress a digital image in a lossless or a lossy manner. In some embodiments, a display controller may compress a digital image by generating a symbol for each pel of the digital image. In particular, the symbol may represent a pel via a match vector and a channel error vector. The match vector may indicate which quantized channels of the pel matched quantized channels of a previous pel. Further, the channel error vector may comprise a lossless or lossy channel for each quantized channel of the pel that did not match a corresponding quantized channel of the previous pel. The channel error may also comprise a lossless or lossy channel error for each quantized channel of the pel that matched a corresponding quantized channel of the previous pel.

30 Claims, 9 Drawing Sheets

MATCH MSB DIGITAL IMAGE COMPRESSION

BACKGROUND

Computing devices typically comprise a display controller to render digital images and to display the rendered digital images on a display device such as a computer monitor or a flat panel display. The display controller may render a digital image and store the rendered digital image in a frame buffer. The frame buffer may be located in shared system memory or in dedicated video memory. When the time comes to display the rendered digital image, the display controller may retrieve the digital image from the frame buffer and may generate a signal to display the retrieved digital image on the display device. The process of storing and retrieving digital images from the frame buffer may consume a significant amount of memory bandwidth. If the frame buffer is located in shared system memory, the performance of the computing device may be greatly reduced due to the display controller significantly reducing the available memory bandwidth for other tasks. Further, if the frame buffer is located in dedicated video memory, the video memory subsystem may be implemented with expensive memory technologies in order to supply sufficient memory bandwidth.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference numerals have been repeated among the figures to indicate corresponding or analogous elements.

DETAILED DESCRIPTION

The following description describes techniques for compressing and decompressing a digital image unit. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
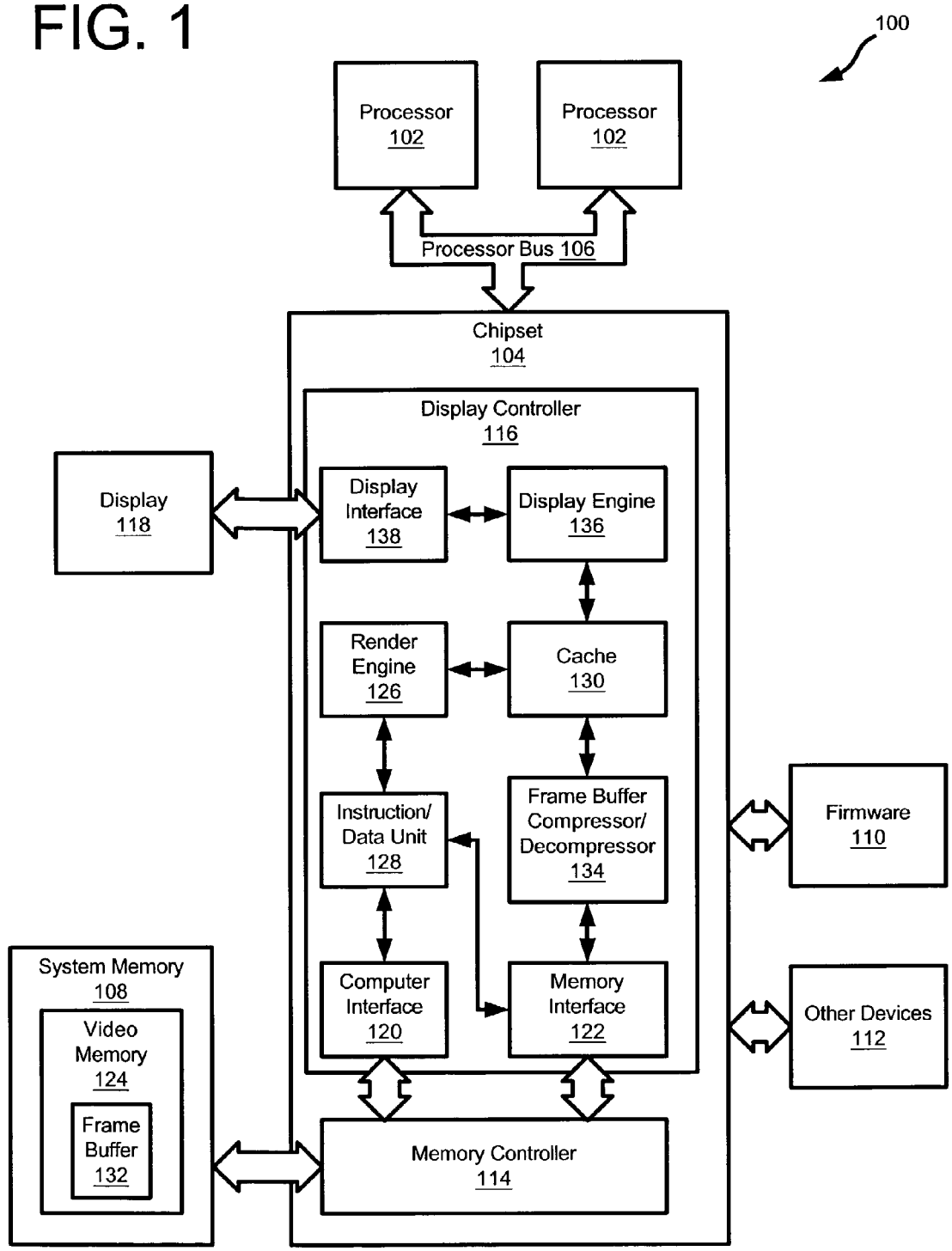
FIG. 1 illustrates an embodiment of a computing device having a chipset with an integrated display controller.

An example embodiment of a computing device 100 is shown in FIG. 1. The computing device 100 may comprise one or more processors 102 coupled to a chipset 104 via a processor bus 106. The chipset 104 may comprise one or more integrated circuit packages or chips that couple the processors 102 to system memory 108, firmware 110 and/or other devices 112 (e.g. a mouse, keyboard, disk drive, scanner, camera, etc.). The firmware 110 may comprise Basic Input/Output System routines (BIOS) the processors 102 may execute during system start-up to initialize components of the computing device 100 and to initiate execution of an operating system.

In one embodiment, the chipset 104 may comprise a memory controller 114. However, in other embodiments, the processors 102 may comprise all or a portion of the memory controller 114. The memory controller 114 may provide an interface for a integrated display controller 116 and other components of the computing device 100 to access the system memory 108. The chipset 104 may also support I/O operations on I/O buses such as peripheral component interconnect (PCI) buses, PCI-Express buses, accelerated graphics port (AGP) buses, universal serial bus (USB) buses, low pin count (LPC) buses, or any other kind of I/O bus (not shown).

The chipset 104 may further comprise an integrated display controller 116 to display digital images on a display device 118 such as, for example, a computer monitor, a flat panel, or a television. The integrated display controller 116 may comprise a computer interface 120 to receive or obtain commands and/or data from the computing device 100. The computer interface 120 may interact with the memory controller 114 to retrieve graphics commands from the system memory 108. Moreover, the computer interface 120 may provide one or more video ports such as, for example, an AGP port, PCI port, or a PCI-Express port via which the computer interface 120 may receive data and/or commands from the processors 102. The integrated display controller 116 may further comprise a memory interface 122 to obtain pels, zones, frames, tiles, etc. from video memory 124. As depicted, the system memory 108 and the video memory 124 may share or be implemented with the same physical memory devices. In such an embodiment, portions of the memory devices are statically or dynamically allocated to either system memory 108 or video memory 124. Accordingly, the memory interface 122 of the integrated display controller 116 may interact with the memory controller 114 of the chipset 104 in order to read or write pels, zones, frames, tiles, etc. to the video memory 124.

Figure 2:
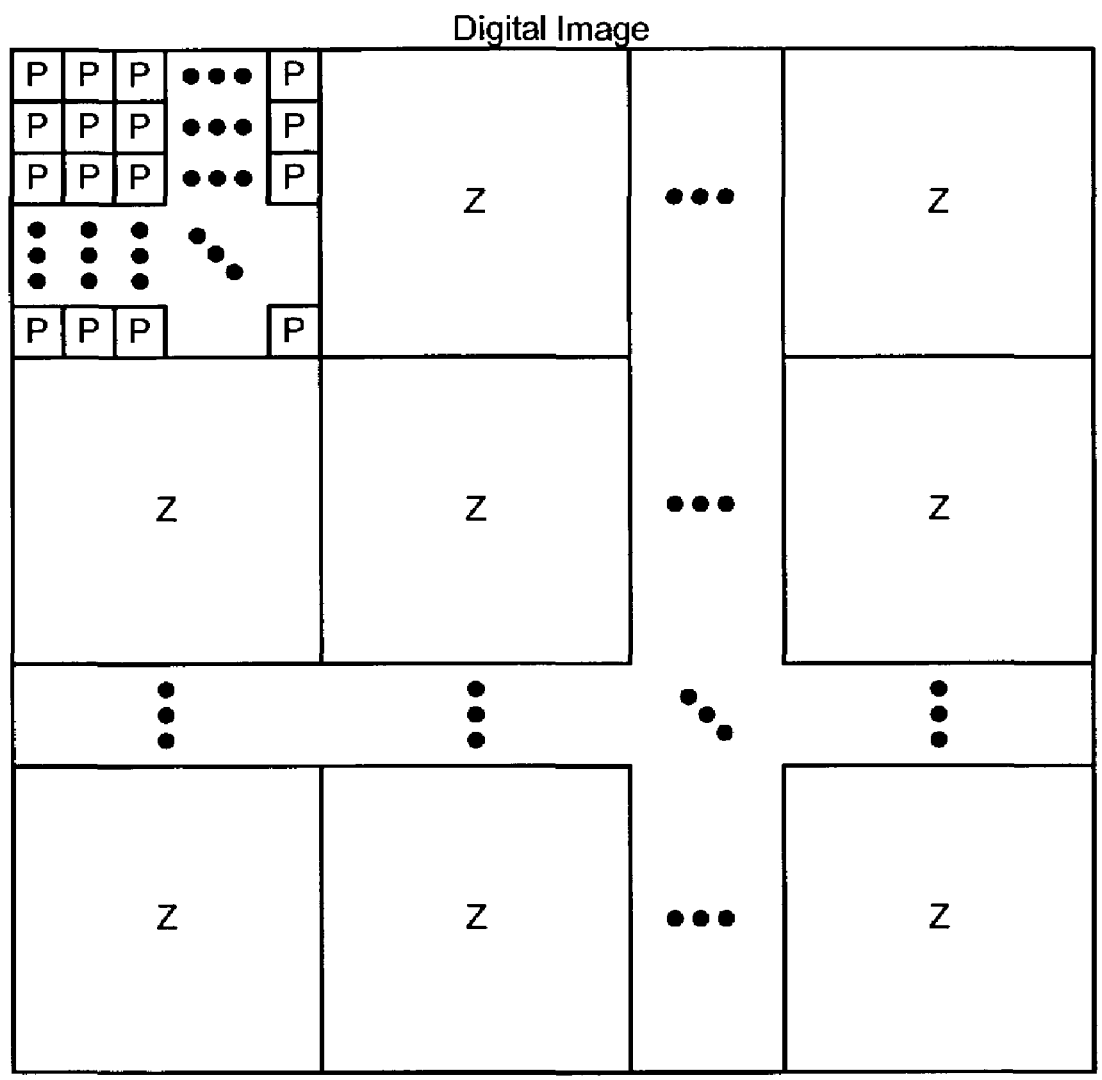
FIG. 2 illustrates an example embodiment of a digital image.

The render engine 126 of the integrated display controller 116 may execute graphics commands to generate digital images for display. As depicted in FIG. 2 a digital image may comprise one or more rectangular non-overlapping zones. Further, each zone may comprise one or more lines of picture elements or pels, and each pel may define a visual appearance (e.g. color, shade, tint, transparency, etc.) of the digital image at a particular point of the digital image. For example, the pels may comprise one or more channels that define the appearance in accordance to a particular video format such as, for example, a RGB format, a YUV format, a RGBA format, or some other format. In RGB format, each pel comprises a red (R) channel, a green (G) channel, and a blue channel. Similarly, in RGBA format, each pel comprises a red (R) channel, a green (G) channel, a blue (B) channel, and alpha (A) channel to indicate a degree of transparency. For example, the integrated display controller 116 may implement 24-bit color by assigning each pel an 8-bit red channel, an 8-bit green channel, and a 8-bit blue channel. In the YUV format, each pel may comprise a luma (Y) channel, a first chrominance (U) channel, and a second chrominance (V) channel. Similarly, the integrated display controller 116 may implement 24-bit color by assigning each pel an 8-bit value for each of the YUV channels. However, the integrated display controller 116 may elect to represent the luma (Y) channel more precisely. Accordingly, the integrated display controller 116 may implement 24-bit YUV color by assigning each pel a 12-bit luma (Y) channel, a 6-bit first chrominance (U) channel, and a 6-bit second chrominance (V) channel. A digital image encoded in the YUV format may also use a spatially reduced chrominance format such as a 4:1:1 format. In the 4:1:1 format, a macro-pel may comprise four luma (Y) channels, one first chrominance (U) channel, and one second chrominance (V) channel that define the visual appearance of portions of the macro-pel.

The render engine 126 may execute graphics commands retrieved from the system memory 108 by the instruction/data unit 128 and may update one or more zones stored in a zone cache 130 of the integrated display controller 116. After rendering one or more zones of a digital image, the render engine 126 may cause the rendered zones to be evicted from the cache 130 and written to the frame buffer 132. The frame buffer compressor/decompressor (codec) 134 may compress the evicted zones and may provide the memory interface 122 with the compressed zones for storage in the frame buffer 132. The display engine 136 may later retrieve rendered digital images from the frame buffer 132 in order to display the digital image at an appropriate time. In particular, the display engine 136 may retrieve compressed zones from the frame buffer 132 and the codec 134 may decompress the retrieved zones. The display engine 136 may mix the decompressed zones of the digital image with other video sources such as for example, an overlay, a hardware cursor, etc. and may provide the display interface 138 with a composited video signal. The display interface 138 may convert the digital video signal received from the display engine 136 to an analog or digital signal that is suitable for the display device 118.

Figure 3:
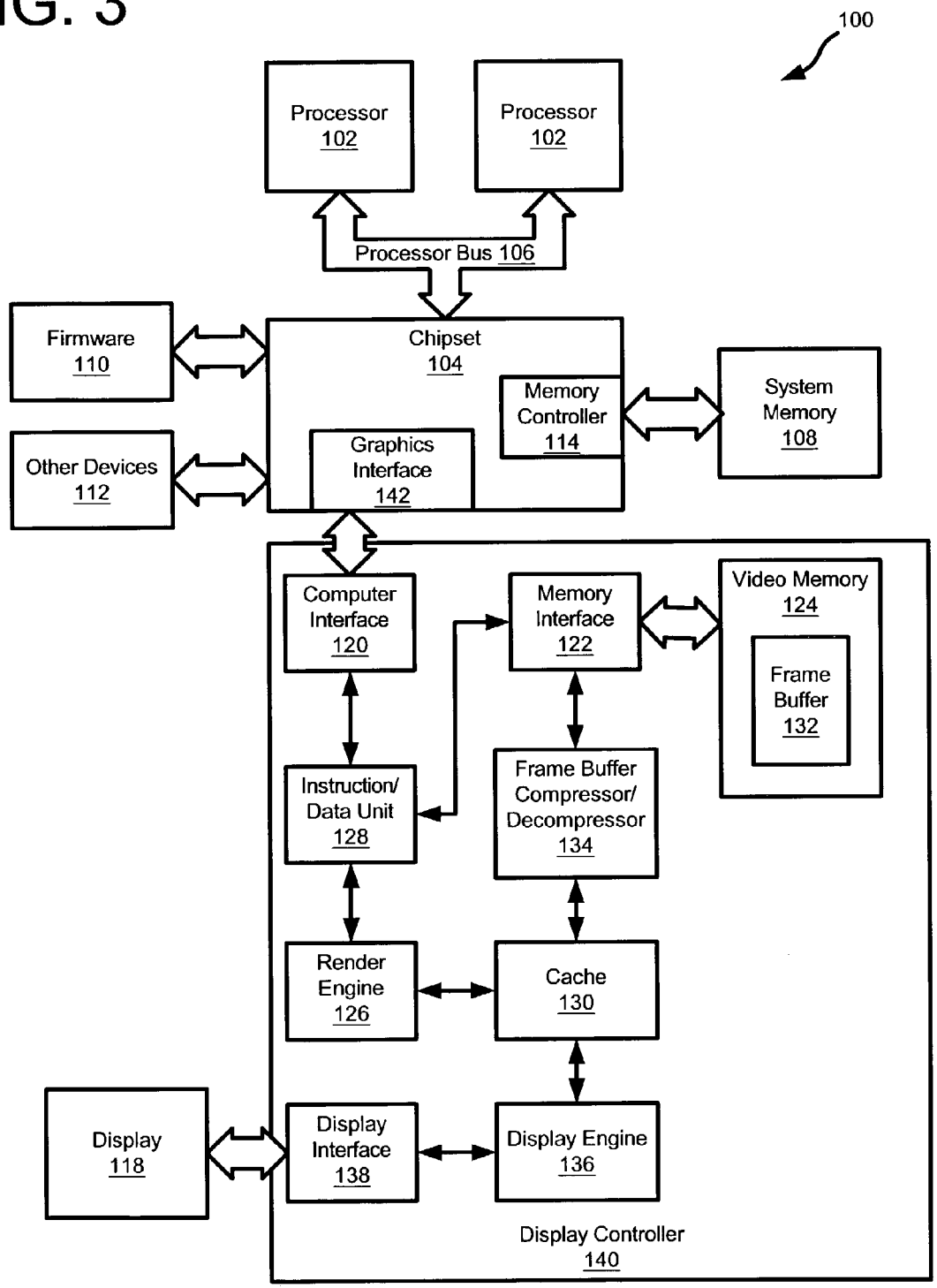
FIG. 3 illustrates an embodiment of a computing device having a non-integrated display controller that is separate from the chipset.

Referring now to FIG. 3, there is illustrated yet another embodiment of the computing device 100. As depicted in FIG. 3, the computing device 100 may comprise a non-integrated display controller 140 that is separate from the chipset 104. Like the integrated display controller 116, the non-integrated display controller 140 may comprise a computer interface 120, a memory interface 122, a render engine 126, an instruction/data unit 128, a zone cache 130, a codec 134, a display engine 136, and a display interface 138.

Furthermore, the non-integrated display controller 140 may comprise on-board video memory 124. The non-integrated display controller 140 may operate in a manner similar to the integrated display controller 116 of FIG. 1. However, the computer interface 120 of the non-integrated display controller 140 may comprise an AGP port, PCI port, a PCI-Express port, or some other device interface to transfer commands and/or data with a corresponding a graphics interface 142 of the chipset 104 that may also comprise an AGP port, a PCI port, a PCI-Express port, or some other device interface. Moreover, the memory interface 122 of the non-integrated display controller 140 may access the video memory 124 directly thus enabling the non-integrated display controller 140 to transfer pels, zones, tiles, frames, etc. to and from the video memory 124 without consuming significant bandwidth of the memory controller 114 and the system memory 108.

Figure 4A:
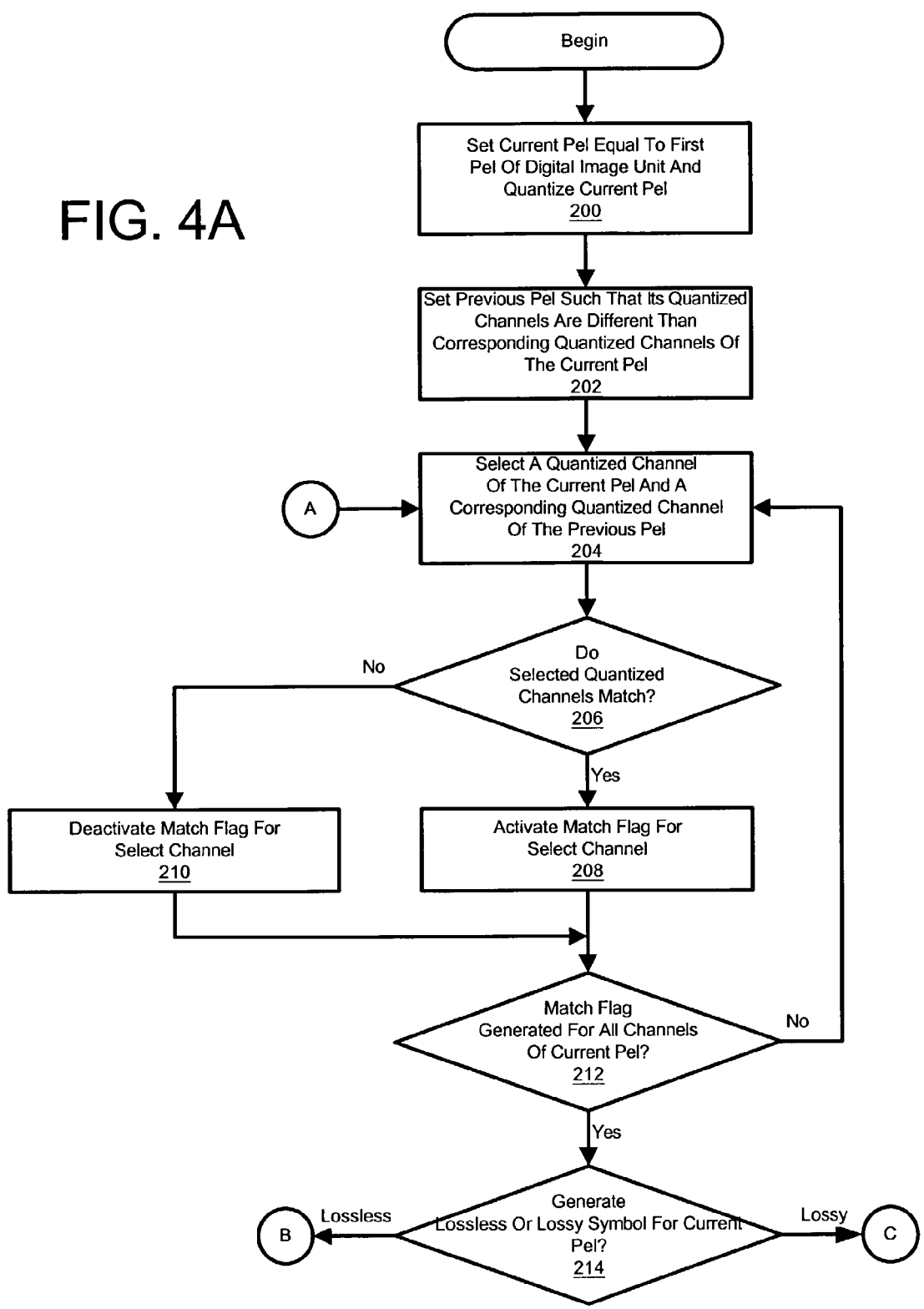
FIGS. 4A, 4B, and 4C illustrate a method which the display controllers of FIG. 1 and FIG. 3 may use to compress or encode a digital image unit.
Figure 4B:
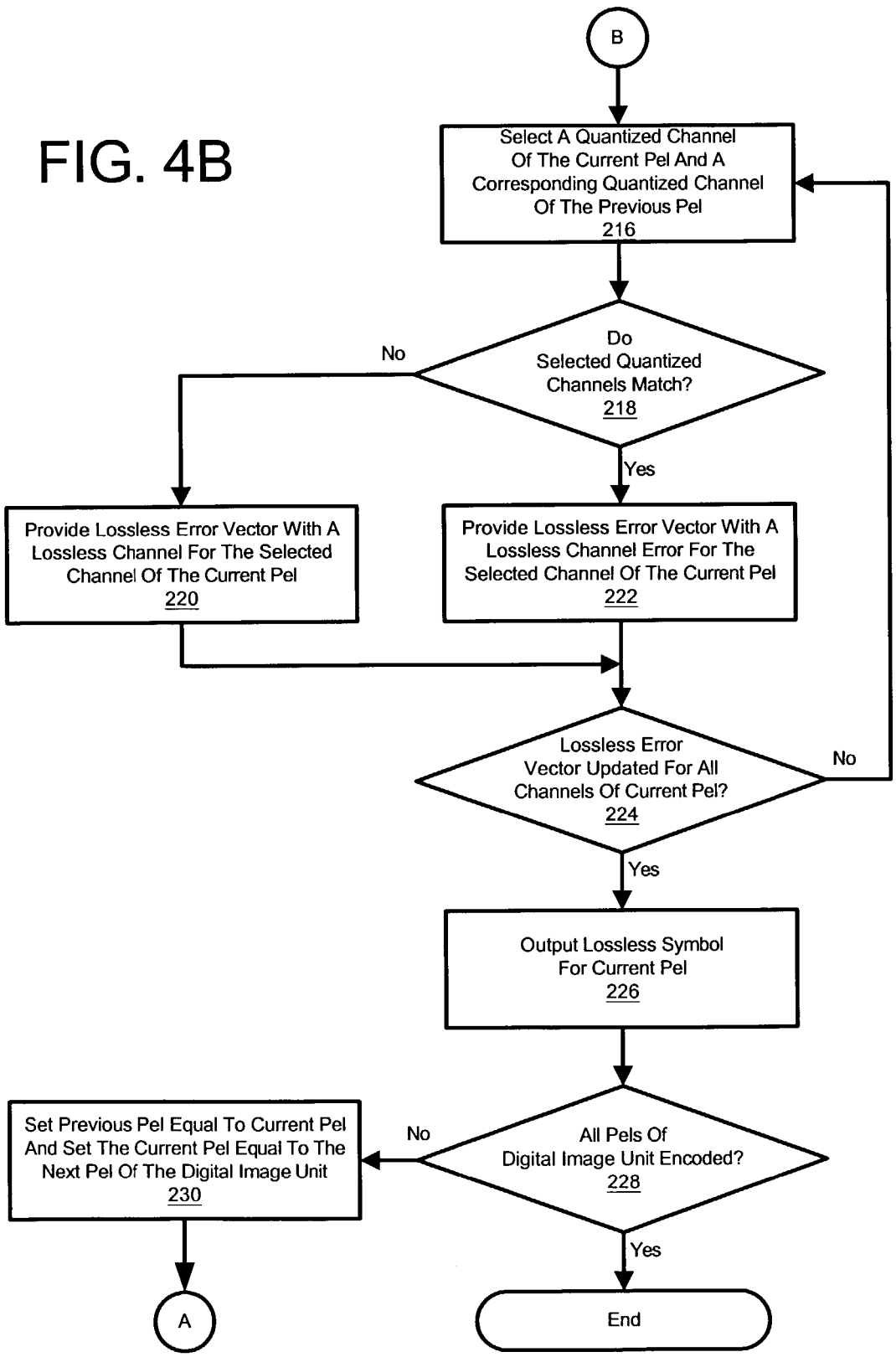
Figure 4C:
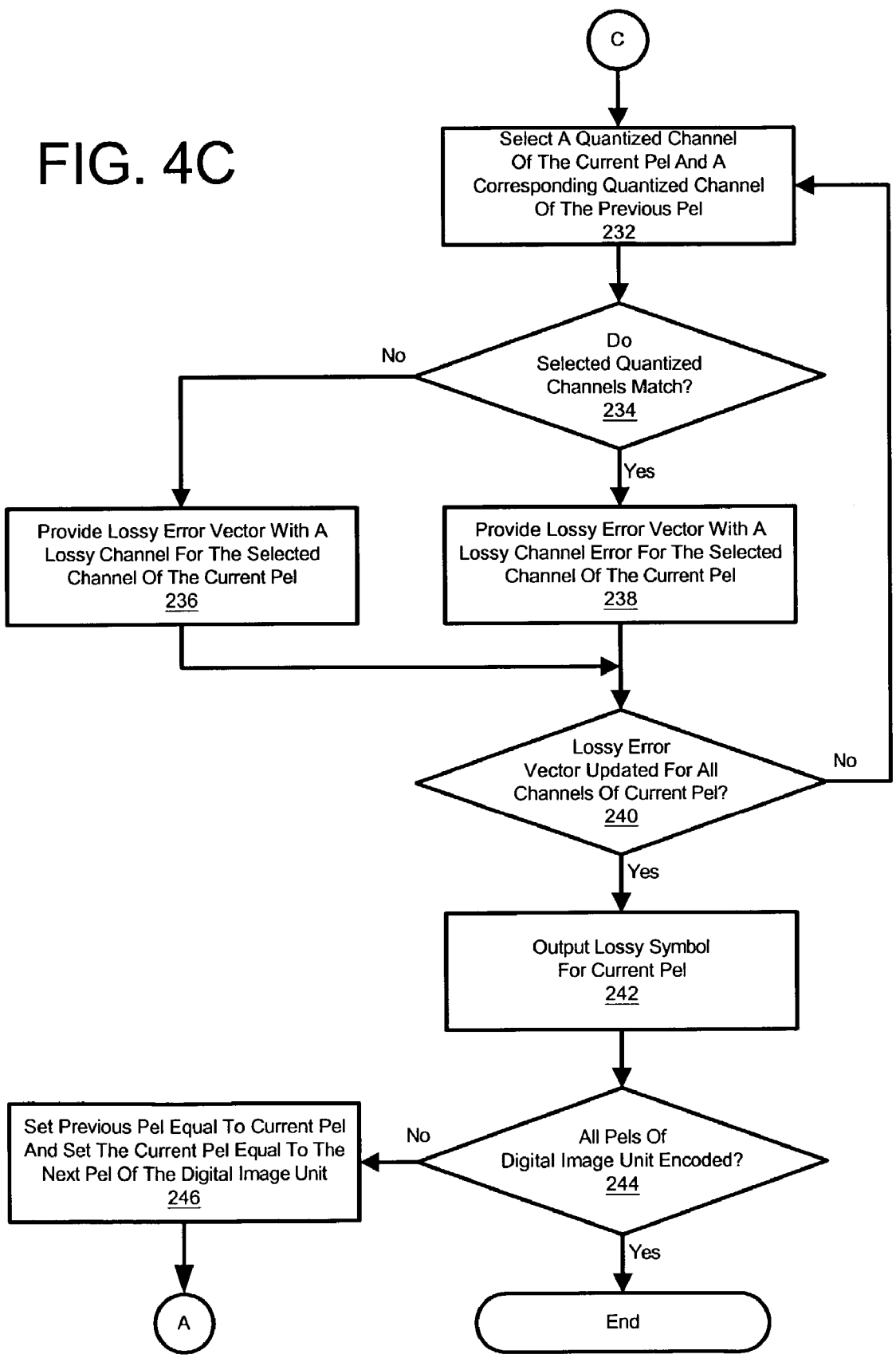

Referring now to FIGS. 4A, 4B, and 4C, there is depicted a method that may be used by the codec 134 to compress a zone line, a zone, a frame line, a frame field, a frame or some other digital image unit prior to being transferred to the frame buffer 132. In particular, the method may compress the digital image unit by replacing each pel of the digital image unit with a variable bit-length symbol. As depicted, the codec 134 in block 200 may set a current pel equal to a first pel of the digital image unit and may quantize one or more channels of the current pel to obtain a quantized current pel. Each quantized channel may comprise one or more most significant bits (MSBs) of each channel and may discard one or more least significant bits (LSBs) from each channel. For example, the codec 134 may quantize a 24-bit RGB pel (e.g. 10010101-11111001-0111000]) at an 18-bit quantization level to obtain a quantized current pel (e.g. 100101-111110-011100) that comprises three 6-bit quantized channels. In particular, the codec 134 may obtain a 6-bit quantized channel by retaining the six MSBs of the 8-bit channel and discarding the two LSBs of the channel. The codec 134 may utilize a variety of different techniques to obtain the quantized pels. In one embodiment, the codec 134 may obtain the quantized pels by performing a bit-wise AND of the channels with a mask and/or by performing appropriate bit shift operations on the channels of the pels. Moreover, the codec 134 may quantize each channel of a pel at a different level. For example, the codec 134 for a 24-bit YUV pel may retain the 7 MSBs of the Y channel, the 6 MSBs of the U channel, and the 5 MSBs of the V channel.

In block 202, the codec 134 may set a previous pel such that each quantized channel of the previous pel is different than the corresponding quantized channel of the current pel. To this end, the codec 134 may set the previous pel equal to the current pel and may toggle the MSB of each channel to ensure that the quantized channels of the previous pel and current pel are different. In one embodiment, such setting of the previous pel causes the codec 134 to generate an intra-pel symbol for the current pel. In one embodiment, the codec 134 may decode an intra-pel symbol to obtain the pel of the intra-pel symbol without reference to another symbol. However, in order to obtain the pel of an inter-pel symbol, the codec 134 may need to decode one or more previous symbols.

The codec 134 may then generate a match vector that comprises a match flag for each quantized channel of the current pel. Each match flag may indicate whether a quantized channel of the current pel is equal to or matches a corresponding quantized channel of the previous pel. To this end, the codes 134 in block 204 may select a quantized channel of the current pel and a corresponding quantized channel of the previous pel. In block 206, the codec 134 may determine whether the selected quantized channel of the current pel matches the selected quantized channel of the previous pel. In response to determining that the selected quantized channels match, the codec 134 in block 208 may activate (e.g. set to 1) a match flag for the selected quantized channel in order to indicate that the selected quantized channel of the current pel matches a corresponding quantized channel of the previous pel. Otherwise, the codec 134 in block 210 may deactivate (e.g. clear to 0) the match flag for the selected quantized channel in order to indicate that the selected quantized channel of the current pel does not match a corresponding quantized channel of the previous pel. In block 212, the codes 134 may determine whether a match flag has been generated for all quantized channels of the current pel. In response to determining that more match flags are to be generated, the codec 134 may return to 204 in order to select another channel and to generate a match flag for the selected channel. Otherwise, the codec 134 may proceed to block 214 in order to determine whether a lossy or lossless symbol is to be generated for the current pel.

The codec 134 in block 214 may determine whether to generate a lossy symbol or a lossless symbol for the current pel. In one embodiment, the codec 134 may determine whether to generate a lossy or lossless symbol based upon a state of one or more configuration registers (not shown) of the chipset 104 or the display controller 116, 140. In another embodiment, the codec 134 may determine whether to generate a lossy or lossless symbol based upon load of the computing device 100. For example, the codec 134 may determine to generate a lossy symbol in response to the load on the memory system, the processor, and/or some other subsystem of the computing device 100 rising above a threshold level. In particular, the codec 134 may determine to increase the lossyness of the symbol in response to determining that available memory bandwidth to the system memory 108 has dropped below a certain level. The codec 134 may later decrease the lossyness of generated symbols or may later generate lossless symbols in response to determining that the available memory bandwidth has risen above a certain level.

In response to determining that a lossless symbol is to be generated, the codec 134 may generate a lossless error vector that comprises lossless channels and/or lossless channel errors that basically indicate channel differences between the current pel and the previous pel. To this end, the codec 134 in block 216 (FIG. 4B) may select a channel and corresponding quantized channel of the current pel and may select a channel and corresponding quantized channel of the previous pel. In block 218, the codec 134 may determine whether the selected quantized channel of the current pel matches the selected quantized channel of the previous pel. In one embodiment, the codec 134 may determine whether the selected quantized channels match based upon the corresponding match flag of the match vector. In another embodiment, the codec 134 may make the determination based upon a comparison of the selected quantized channels.

In response to determining that the selected quantized channels do not match, the codec 134 in block 220 may provide a lossless channel vector with a lossless channel for the current pel that is equal to the selected channel of the current pel. For example, if each 24-bit RGB pel is quantized to 6-bit per a channel and the R channel of the current pel is 10010101 and the R channel of the previous pel is 10000000, then the quantized R channel of 100101 for the current pel does not match the quantized R channel of 100000 for the previous pel. Accordingly, the codec 134 may provide the lossless error vector with a lossless channel that is equal to the R channel value of 10010101 for the current pel. In response to determining that the selected quantized channels match, the codec 134 in block 222 may provide the lossless error vector with a lossless channel error for the selected channel that is equal to the bits discarded from the selected channel during the quantization of the current pel. For example, if each 24-bit RGB pel is quantized to 6-bit per a channel and the R channel of the current pel is 10010101 and the R channel of the previous pel is 10010100, then quantized R channel of 100101 for the current pel matches the quantized R channel of 100101 for the previous pel. Accordingly, the codec 134 may provide the lossless error vector with a lossless channel error that is equal to 01 which is the 2 least significant bits (LSBs) discarded from the R channel of the current pel during quantization.

The codec 134 in block 224 may determine whether the lossless error vector has been updated with a lossless channel or a lossless channel error for each channel of the current pel. In response to determining that additional updates are to be performed, the codec 134 may return to 216 to select another channel of the current pel and provide the lossless error vector with an appropriate value for the selected channel. Otherwise, the codec 134 may proceed to block 226. In block 226, the codec 134 may output a lossless symbol that represents the current pel. In one embodiment, the codec 134 may output the lossless symbol by writing to an output buffer the match vector for the current pel followed by the lossless error vector for the current pel. In another embodiment, the codec 134 may output the lossless symbol by further writing to the output buffer a compression mode that indicates the symbol is lossless. The symbol typically includes fewer bits than the original pel representation. However, in one embodiment, the lossless symbol may actually include more bits than the original pel representation. For example, in one embodiment, a lossless symbol that represents or encodes a single 24-bit RGB pel may include a 3-bit match vector and a 24-bit lossless error vector if none of the quantized channels of the current pel match the quantized channels of the previous pel.

In block 228, the codec 134 may determine whether all pels of the digital image unit have been encoded. If all pels of the digital image unit have been encoded, then encoding of the digital image unit is complete and the codec 134 may exit. Otherwise, the codec 134 in block 230 may set the previous pel equal to the current pel and may set the current pel equal to another pel of the digital image unit. The codec 134 may then return to 204 to quantize the new current pel and to generate a symbol for the new current pel.

In response to determining that a lossy symbol is to be generated, the codec 134 may generate a lossy error vector that comprises lossy channels and/or lossy channel errors that basically indicate channel differences between the current pel and the previous pel. To this end, the codec 134 in block 232 (FIG. 4C) may select a channel and a corresponding quantized channel of the current pel and may select a channel and a corresponding quantized channel of the previous pel. In block 234, the codec 134 may determine whether the selected quantized channel of the current pel matches the selected quantized channel of the previous pel. In one embodiment, the codec 134 may determine whether the selected quantized channels match based upon the corresponding match flag of the match vector. In another embodiment, the codec 134 may make the determination based upon a comparison of the selected quantized channels.

In response to determining that the selected quantized channels do not match, the codec 134 in block 236 may provide a lossy error vector with a lossy channel that is equal to a MSB subset of the corresponding channel of the current pel. For example, if each 24-bit RGB pel is quantized to 6-bit per a channel and the R channel of the current pel is 10010101 and the R channel of the previous pel is 10000000, then the quantized R channel of 100101 for the current pel does not match the quantized R channel of 100000 for the previous pel. Accordingly, the codec 134 may provide the lossy error vector with a lossy channel that is equal to 1001010 which is the 7 MSBs of the R channel for the current pel. In response to determining that the selected quantized channels match, the codec 134 in block 238 may provide the lossy error vector with a lossy channel error that is equal to a MSB subset of the bits discarded from the selected channel during the quantization of the current pel. For example, if each 24-bit RGB pel is quantized to 6-bits per a channel and the R channel of the current pel is 10010101 and the R channel of the previous pel is 10010100, then the quantized R channel of 100101 for the current pel matches the quantized R channel of 100101 for the previous pel. Accordingly, the codec 134 may provide the lossy error vector with a lossy channel error that is equal to 0 which is the MSB of the 2 LSBs discarded from the R channel of the current pel during quantization.

In one embodiment, the codec 134 may support one or more lossy levels. In particular, the codec 134 may support 1, 2, or 3 bits of lossyness per a channel. For example, if 4-bits are discarded from a channel during quantization, then the codec 134 may support a first lossyness level that discards the LSB from each lossy channel and from each lossy channel error, a second lossyness level that discards the 2 LSBs from each lossy channel and each lossy channel error, a third lossyness level that discards the 3 LSBs from each lossy channel and each lossy channel error, and a fourth lossyness level that discards the 4 LSBs from each lossy channel and each lossy channel error. Accordingly, if the 4 LSBs are discarded from each channel during quantization and the codec 134 is operating at the above fourth lossyness level, then a lossy channel error for a channel may comprise zero bits. Besides supporting different lossyness levels, the codec 134 may support defining the lossyness level on a per channel bases. For example, the codec 134 for a 24-bit YUV pel may discard the LSB of the Y channel, the 2 LSBs of the U channel, and the 3 LSBs of the V channel.

The codec 134 in block 240 may determine whether the lossy error vector has been updated with a lossy channel or a lossy channel error for each channel of the current pel. In response to determining that additional updates are to be performed, the codec 134 may return to 216 to select another channel of the current pel and provide the lossy error vector with an appropriate value for the selected channel. Otherwise, the codec 134 may proceed to block 242. In block 242, the codec 134 may output a lossy symbol that represents the current pel. In one embodiment, the codec 134 may output the lossy symbol by writing to an output buffer the match vector for the current pel followed by the lossy error vector for the current pel. In another embodiment, the codec 134 may output the lossy symbol by further writing to the output buffer a compression mode that indicates the symbol is lossy.

In block 244, the codec 134 may determine whether all pels of the digital image unit have been encoded. If all pels of the digital image unit have been encoded, then encoding of the digital image unit is complete and the codec 134 may exit. Otherwise, the codec 134 in block 246 may set the previous pel equal to the current pel and may set the current pel equal to another pel of the digital image unit. The codec 134 may then return to 204 to quantize the new current pel and to generate a symbol for the new current pel.

Figure 5A:
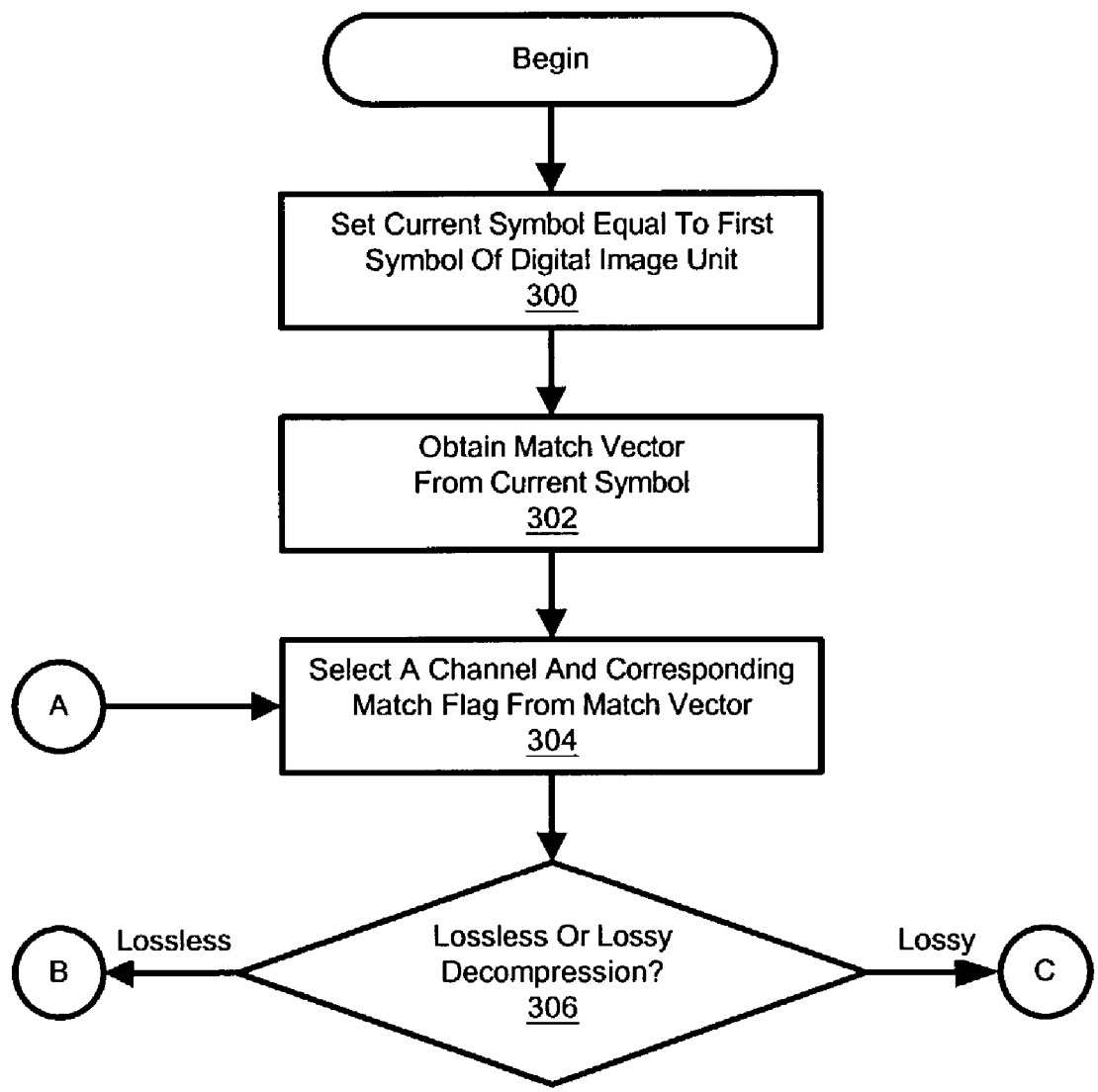
FIGS. 5A, 5B, and 5C illustrate a method which the display controllers of FIG. 1 and FIG. 3 may use to decompress or decode an encoded digital image unit.
Figure 5B:
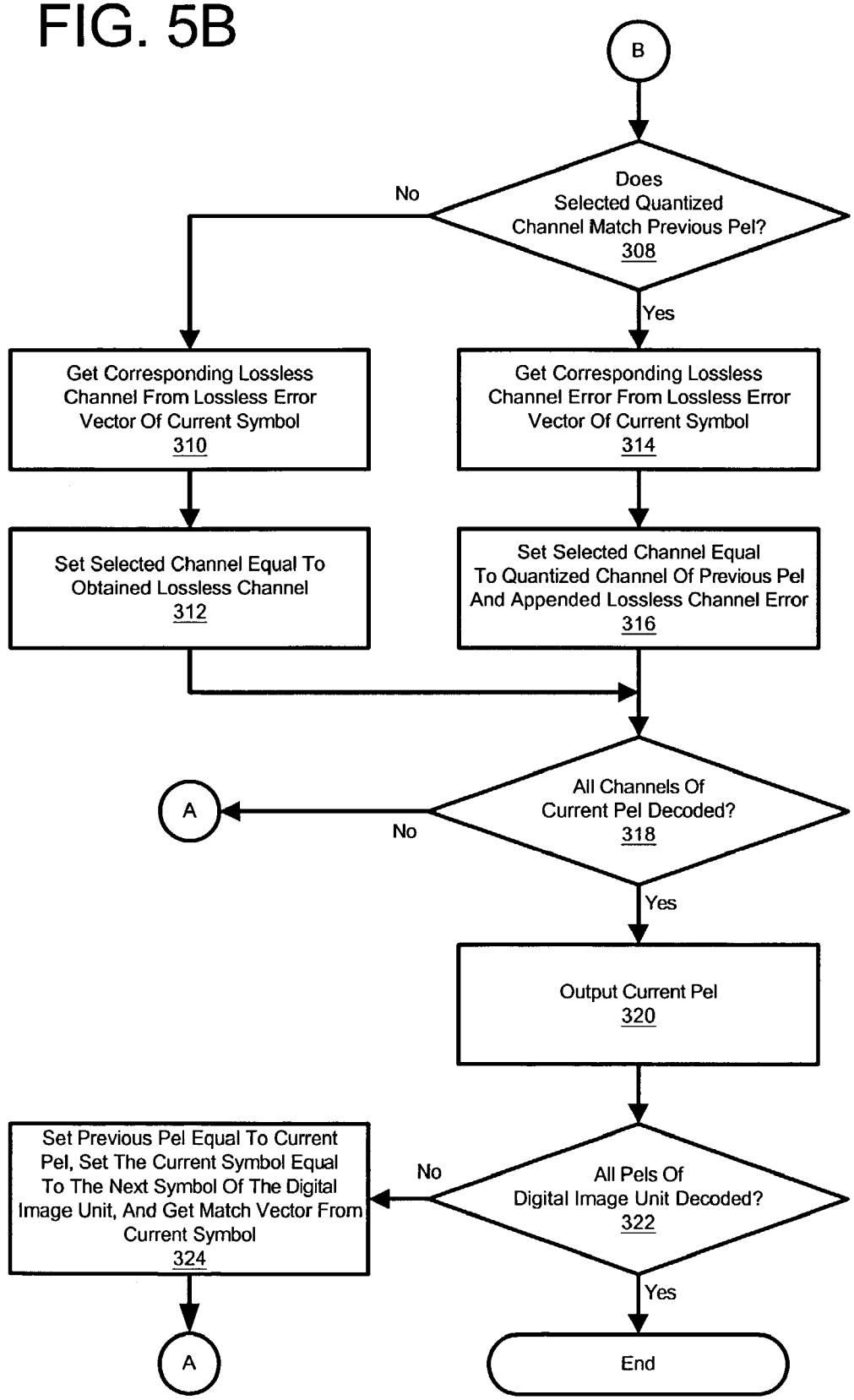
Figure 5C:
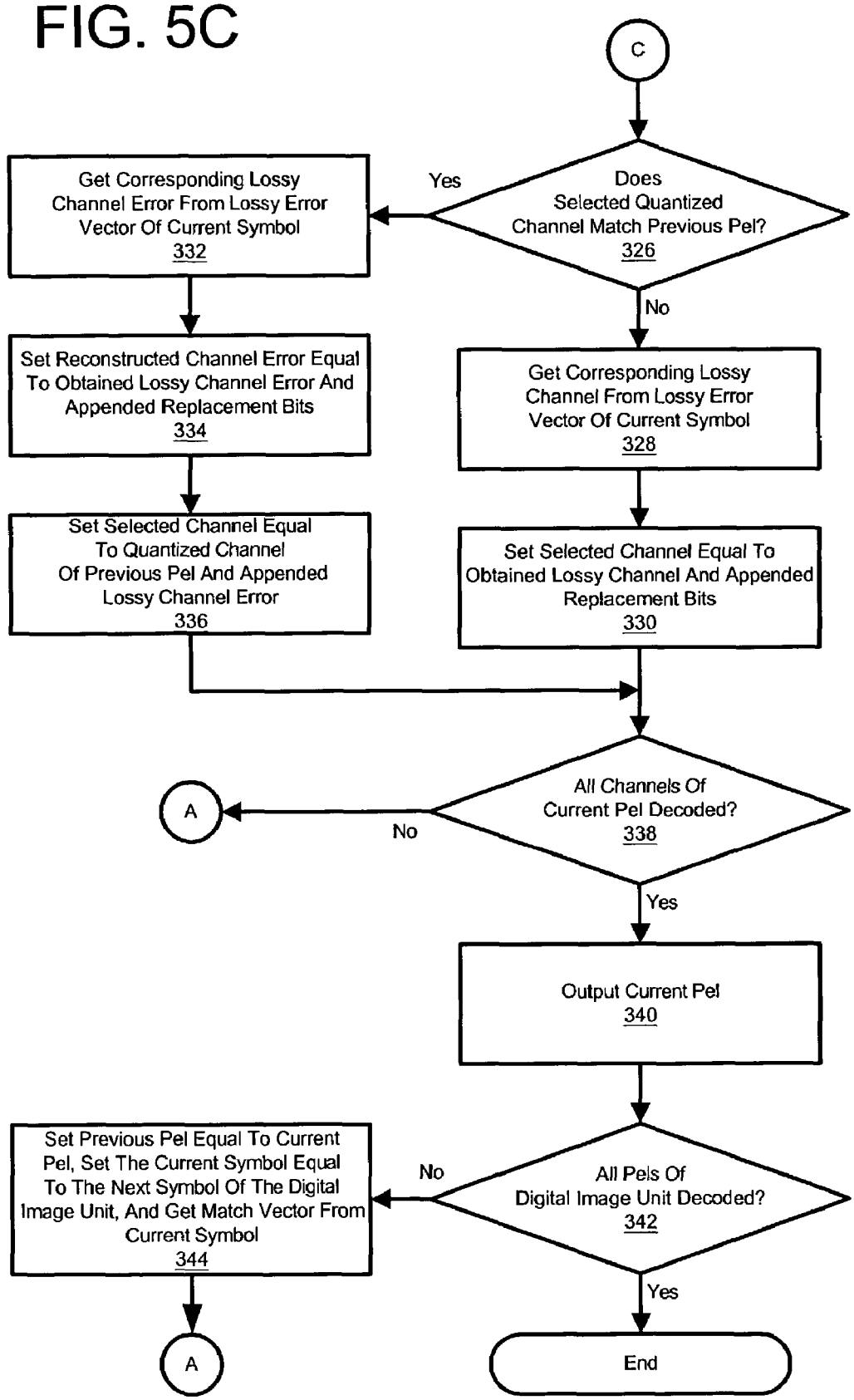

Referring now to FIGS. 5A, 5B, and 5C, there is depicted a method that may be used by the codec 134 to reconstruct a zone line, a zone, a frame line, a frame field, a frame or some other digital image unit from a plurality of symbols. The codec 134 in block 300 may set a current symbol to a first symbol of a digital image unit. In block 302, the codec 134 may obtain a match vector from the current symbol. In one embodiment, the codec 134 may set the match vector equal to the first 3 bits of the current symbol. The codec 134 in block 304 may select a channel of the current pel and may obtain from the match vector a match flag for the selected channel.

In block 306, the codec 134 may determine whether to perform lossy or lossless decompression. In one embodiment, the codec 134 may determine whether to perform lossless or lossy decompression based upon one or more registers of the chipset 104 and/or the display controller 116, 140. In another embodiment, the codec 134 may determine whether to perform lossless decompression or some level of lossy decompression based upon a compression mode obtained from the symbol.

In response to determining to perform lossless decompression, the codec 134 in block 308 (FIG. 5B) may determine based upon the obtained match flag whether the quantized channel of the current pel matches the corresponding quantized channel of the previous pel. In response to determining that the quantized channels do not match, the codec 134 in block 310 may obtain the next lossless channel from a lossless error vector of the current symbol. In one embodiment, the codec 134 generates an intra-pel symbol for the first pel of a digital image unit. Accordingly, the match vector of the first symbol of a digital image unit indicates that none of the quantized channels of the first pel equal the quantized channels of the previous pel. Accordingly, the first pel may be obtained from the first symbol of the digital image unit without reference to a possibly non-existent previous pel. In block 312, the codec 134 may reconstruct the channel of the current pel by setting the channel equal to the lossless channel obtained from the lossless error vector. In response to determining that the quantized channel of the current pel matched the quantized channel of the previous pel, the codec 134 in block 314 may obtain the next lossless channel error from the lossless error vector of the current symbol. The codec 134 in block 316 may reconstruct the channel of the current pel by setting the channel equal to the result of appending the obtained lossless channel error to the quantized channel of the previous pel.

The codec 134 in block 318 may determine whether all channels of the pel have been decoded. In response to determining that additional channels are to be decoded, the codec 134 may return to block 304 to select the next channel of the current pel and corresponding match flag from the match vector. Otherwise, the codec 134 in block 320 may output the reconstructed channels of the current pel to an output buffer. In block 322, the codec 134 may determine whether the codec 134 has decoded the last symbol of the digital image. If the last symbol of the digital image has been decoded, then the codec 134 has finished decoding the symbols of the digital image unit and may exit. Otherwise, the codec 134 in block 324 may set the previous pel equal to the reconstructed current pel and may set the current symbol equal to the next symbol of the digital image unit.

Further, the codec 134 in block 324 may obtain a match vector from the new current symbol. The codec 134 may then return to block 304 to decode the newly obtained current symbol.

In response to determining to perform lossy decompression, the codec 134 in block 326 (FIG. 5C) may determine based upon the obtained match flag whether the quantized channel of the current pel matches the corresponding quantized channel of the previous pel. In response to determining that the quantized channels do not match, the codec 134 in block 328 may obtain the next lossy channel from a lossy error vector of the current symbol. In block 330, the codec 134 may reconstruct the channel of the current pel by setting the channel equal to the result of appending one or more replacement bits to the lossy channel obtained from the lossy error vector. In one embodiment, the codec 134 may use a fixed predetermined value (e.g. 0, 10, or 100) for the replacement bits used to replace the bits lost during compression. In another embodiment, the codec 134 may dynamically alter the replacement bits to dither the lost bits. For example, the codec 134 may toggle a single replacement bit between 0 and 1 for each new symbol. For an embodiment that discards more than a single bit, the codec 134 may toggle between two central values. In particular, the codec 134 may generate the two replacement bits by toggling between 01 and 10, may generate three replacement bits by toggling between 011 and 100, and may generate four replacement bits by toggling between 0111 and 1000. The above techniques are merely illustrative and the codec 134 may use other techniques to replace the missing bits of the lossy channel.

In response to determining that the quantized channel of the current pel matches the quantized channel of the previous pel, the codec 134 in block 332 may obtain the next lossy channel error from the lossy error vector of the current symbol. In block 334, the codec 134 may append one or more replacement bits to the lossy channel error in order to obtain a reconstructed channel error. The codec 134 may generate the replacement bits in a manner as described above in regard to block 330. In block 336, the codec 134 may reconstruct the channel of the current pel by setting the channel equal to the quantized channel of the previous pel with the reconstructed channel error appended thereto.

The codec 134 in block 338 may determine whether all channels of the pel have been decoded. In response to determining that additional channels are to be decoded, the codec 134 may return to block 304 to select the next channel of the current pel and corresponding match flag from the match vector. Otherwise, the codec 134 in block 340 may output the reconstructed channels of the current pel to an output buffer. In block 342, the codec 134 may determine whether the codec 134 has decoded the last symbol of the digital image. If the last symbol of the digital image has been decoded, then the codec 134 has finished decoding the symbols of the digital image unit and may exit. Otherwise, the codec 134 in block 344 may set the previous pel equal to the reconstructed current pel and may set the current symbol equal to the next symbol of the digital image unit. Further, the codec 134 in block 344 may obtain a match vector from the new current symbol. The codec 134 may then return to block 304 to decode the newly obtained current symbol.

The computing device 100 may perform all or a subset of the example method of FIGS. 4A, 4B, and 4C and the example method of FIGS. 5A, 5B, and 5C in response to executing instructions of a machine readable medium such as, for example, read only memory (ROM); random access memory (RAM); magnetic disk storage media; optical storage media; flash memory devices; and/or electrical, optical, acoustical or other form of propagated signals such as, for example, carrier waves, infrared signals, digital signals, analog signals. Furthermore, while the example methods of FIGS. 4A, 4B, 4C, 5A, 5B, and 5C are illustrated as a sequence of operations, the computing device 100 in some embodiments may perform various illustrated operations of the methods in parallel or in a different order.

An example of lossless compressing/decompressing and an example of lossy compressing/decompressing are shown in the following Tables 1–7. In particular, Table 1 shows a zone line having four 24-bit RGB pels. Each pel of Table 1 comprises a lossless 8-bit R channel, a lossless 8-bit G channel, and a lossless 8-bit B channel. Table 2 shows the four 24-bit RGB pels after being quantized to an 18-bit quantization level using 6-bits per a channel. As can be seen, the codec may generate the 18-bit quantized pels by simply dropping the 2 LSBs of each lossless channel. Further, Table 3 shows 7-bit lossy channels for the pels of Table 1.

TABLE 1

Zone Line of four 24-bit RGB Pels

| Position | R channel | G Channel | B Channel |
|---|---|---|---|
| 0 | 10010101 | 11111001 | 01110000 |
| 1 | 10010100 | 11111011 | 01110001 |
| 2 | 10010111 | 11111011 | 01110010 |
| 3 | 10000000 | 11111011 | 01110001 |

TABLE 2

18-bit Quantized Pels of Zone Line

| Position | R channel | G Channel | G Channel |
|---|---|---|---|
| 0 | 100101 | 111110 | 011100 |
| 1 | 100101 | 111110 | 011100 |
| 2 | 100101 | 111110 | 011100 |
| 3 | 100000 | 111110 | 011100 |

TABLE 3

Lossy Channels For Pels Of Zone Line

| Position | R channel | G Channel | B Channel |
|---|---|---|---|
| 0 | 1001010 | 1111100 | 0111000 |
| 1 | 1001010 | 1111101 | 0111000 |
| 2 | 1001011 | 1111101 | 0111001 |
| 3 | 1000000 | 1111101 | 0111000 |

Table 4 further shows lossless 2-bit channel errors for each 6-bit quantized channel of Table 2. As can be seen from Table 4, the codec may generate a 2-bit lossless channel error by simply retaining the 2 LSBs dropped from each 8-bit lossless channel during pel quantization. Referring now to Table 5, 1-bit lossy channel errors are shown for each 6-bit quantized channel of Table 2. The codec may generate the 1-bit lossy channel errors by simply retaining the MSB dropped from each channel during pel quantization.

TABLE 4

Lossless Channel Errors For 6-Bit Quantized Channels

| Position | R Channel Error | G Channel Error | B Channel Error |
|---|---|---|---|
| 0 | 01 | 01 | 00 |
| 1 | 00 | 11 | 01 |
| 2 | 11 | 11 | 10 |
| 3 | 00 | 11 | 01 |

TABLE 5

Lossy Channel Errors For 6-Bit Quantized Channels

| Position | R Channel Error | G Channel Error | B Channel Error |
|---|---|---|---|
| 0 | 0 | 0 | 0 |
| 1 | 0 | 1 | 0 |
| 2 | 1 | 1 | 1 |
| 3 | 0 | 1 | 0 |

Referring now to Table 6, there is illustrated a lossless encoding of the four 24-bit RGB pels of Table 1. As depicted, the lossless encoding includes a symbol for each pel of Table 1. In particular, symbol 0 comprises a 3-bit match vector that indicates that none of the quantized channels of pel 0 match the quantized channels of the previous pel. Accordingly, symbol 0 includes in its lossless error vector each 8-bit lossless channel of pel 0. Symbol 1 comprises a 3-bit match vector that indicates all quantized channels of pel 1 match the corresponding quantized channels of pel 0. Accordingly, symbol 1 includes in its lossless error vector each 2-bit lossless channel error depicted in Table 4 for pel 1. Similarly, symbol 2 comprises a 3-bit match vector that indicates all quantized channels of pel 2 match the corresponding quantized channels of pel 1. Symbol 2 therefore includes in its lossless error vector each 2-bit lossless channel error depicted in Table 4 for pel 2. Symbol 3 comprises a 3-bit match vector that indicates that the quantized G and B channels of pel 3 match the quantized G and B channels of pel 2, but further indicates that the quantized R channel of pel 3 does not match the quantized R channel of pel 2. Accordingly, symbol 3 includes in its lossless error vector the 8-bit lossless R channel for pel 3, the 2-bit lossless G channel error for pel 3, and the 2-bit lossless B channel error for pel 3. As shown in Table 6, symbols 0–3 represent 96 bits of pel data with only 60 bits thus providing a compressed representation of the pels 0, 1, 2, and 3. The codec may decode the 60 bits of symbols 0–3 to obtain the 96 bits of pels 0–3 without data loss.

TABLE 6

Lossless Symbols for Zone Line

| Symbol | Match Vector | Lossless Error Vectors | Un-Enc Bits | Enc Bits |
|---|---|---|---|---|
| 0 | 000 | 10010101-11111001-01110000 | 24 | 27 |
| 1 | 111 | 00-11-01 | 24 | 9 |
| 2 | 111 | 11-11-10 | 24 | 9 |
| 3 | 011 | 10000000-11-01 | 24 | 15 |

Referring now to Table 7, there is illustrated a lossy encoding of the four 24-bit RGB pels of Table 1. As depicted, the lossy encoding includes a symbol for each pel of Table 1. In particular, symbol 0 comprises a 3-bit match vector that indicates that none of the quantized channels of pel 0 match the quantized channels of the previous pel. Accordingly, symbol 0 includes in its lossy error vector each lossy 7-bit channel depicted in Table 3 for pel 0. Symbol 1 comprises a 3-bit match vector that indicates all quantized channels of pel 1 match the corresponding quantized channels of pel 0. Accordingly, symbol 1 includes in its lossy error vector each 1-bit lossy channel error depicted in Table 5 for pel 1. Similarly, symbol 2 comprises a 3-bit match vector that indicates all quantized channels of pel 2 match the corresponding quantized channels of pel 1. Symbol 2 therefore includes in its lossy error vector each 1-bit lossy channel error depicted in Table 5 for pel 2. Symbol 3 comprises a 3-bit match vector that indicates that the quantized G and B channels of pel 3 match the quantized G and B channels of pel 2, but the quantized R channel of pel 3 does not match the quantized R channel of pel 2. Accordingly, symbol 3 includes in its lossy error vector the 7-bit lossy R channel for pel 3, the 2-bit lossy G channel error for pel 3, and the 2-bit lossy B channel error for pel 3. As shown in Table 7, symbols 0–3 represent 96 bits of pel data with only 48 bits thus providing a compressed representation of the pels 0, 1, 2, and 3.

TABLE 7

Lossy Symbols for Zone Line

| Symbol | Match Vector | Lossless Error Vectors | Un-Enc Bits | Enc Bits |
|---|---|---|---|---|
| 0 | 000 | 1001010-1111100-0111000 | 24 | 24 |
| 1 | 111 | 0-1-0 | 24 | 6 |
| 2 | 111 | 1-1-1 | 24 | 6 |
| 3 | 011 | 1000000-1-0 | 24 | 12 |

If a match flag indicates that a quantized channel of the current pel does not match the corresponding quantized channel of the previous pel, then the codec may latter reconstruct the channel by appending 1 replacement bit to the 7-bit lossy channel of the symbol. However, if a match flag indicates that a quantized channel of the current pel matches the corresponding quantized channel of the previous pel, then the coded may latter reconstruct the channel by appending 1 replacement bit to the 1-bit lossy channel error of the symbol to obtain a reconstructed channel error, and appending the reconstructed channel error to the 6-bit quantized channel of the previous pel. Table 8 shows one possible set of four 24-bit pels that may be obtained from the lossy symbols of Table 7. In particular, the four pels of Table 7 were obtained by setting the replacement bit for pel 0 equal to 0 and toggling the replacement bit for each pel thereafter. As can be seen from comparing the reconstructed pels of Table 8 with the original pels of Table 1, the LSB of each channel is sometimes correct and is sometimes incorrect but in general the reconstructed channels are very close if not equal to the original channels. In most cases, a user would be unable to discern a difference between an original digital image and a digital image reconstructed from lossy symbols.

TABLE 8

Reconstructed Zone Line From Lossy Symbols With Dithering

| Position | R channel | G Channel | B Channel |
|---|---|---|---|
| 0 | 10010100 | 11111000 | 01110000 |
| 1 | 10010101 | 11111011 | 01110001 |

TABLE 8-continued

Reconstructed Zone Line From Lossy Symbols With Dithering

| Position | R channel | G Channel | B Channel |
|---|---|---|---|
| 2 | 10010110 | 11111010 | 01110010 |
| 3 | 10000001 | 11111011 | 01110001 |

While certain features of the invention have been described with reference to example embodiments, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method comprising
   quantizing a first pel comprising a plurality of first channels to obtain a first quantized pel comprising a plurality of first quantized channels,
   quantizing a second pel comprising a plurality of second channels to obtain a second quantized pel comprising a plurality of second quantized channels,
   generating a match vector that indicates which of the plurality of first quantized channels match the plurality of second quantized channels, and
   generating an error vector that indicates differences between the plurality of first channels of the first pel and the plurality of second channels of the second pel.

2. The method of claim 1 further comprising generating a symbol to represent the first pel that comprises the matched vector and the error vector.

3. The method of claim 1 wherein
   quantizing the first pel comprises discarding one or more least significant bits of the plurality of first channels, and
   quantizing the second pel comprises discarding one or more least significant bits of the plurality of second channels.

4. The method of claim 3 further comprising
   for each first quantized channel of the plurality of first quantized channels that matches a corresponding second quantized channel of the plurality of second quantized channels, providing the error vector with a lossless channel error that comprises the one or more least significant bits discarded from the respective first quantized channel.

5. The method of claim 3 further comprising
   for each first quantized channel of the plurality of first quantized channels that matches a corresponding second quantized channel of the plurality of second quantized channels, providing the error vector with a lossy channel error that comprises a subset of the one or more least significant bits discarded from the respective first quantized channel.

6. The method of claim 5 further comprising adjusting lossyness of the lossy channel error based upon load of a computing device.

7. The method of claim 2 further comprising
   for each first quantized channel of the plurality of first quantized channels that does not match a corresponding second quantized channel of the plurality of second quantized channels, providing the error vector of the symbol with a lossless channel that comprises all bits of the corresponding first channel.

8. The method of claim 2 further comprising
   for each first quantized channel of the plurality of first quantized channels that does not match a corresponding second quantized channel of the plurality of second quantized channels, providing the error vector of the symbol with a lossy channel that comprises a subset of the most significant bits of the corresponding first channel.

9. The method of claim 8 further comprising adjusting lossyness of the lossy channel based upon load of a computing device.

10. A method comprising
    obtaining a symbol that represents a current pel comprising a plurality of channels,
    obtaining a match vector from the symbol that indicates which quantized channels of the current pel match corresponding quantized channels of a previous pel,
    obtaining an error vector from the symbol that indicates differences between the current pel and the previous pel, and
    reconstructing the current pel based upon the match vector, the error vector, and the previous pel.

11. The method of claim 10 further comprising
    for each quantized channel of the current pel that the match vector indicates matches a corresponding quantized channel of the previous pel, reconstructing a channel of the current pel based upon a lossless channel error of the error vector and the corresponding quantized channel of the previous pel.

12. The method of claim 11 further comprising dithering the one or more replacement bits.

13. The method of claim 10 further comprising
    for each quantized channel of the current pel that the match vector indicates matches a corresponding quantized channel of the previous pel, reconstructing a channel of the current pel based upon a lossy channel error of the error vector, the corresponding quantized channel of the previous pel, and one or more replacement bits.

14. The method of claim 10 further comprising
    for each quantized channel of the current pel that the match vector indicates does not match a corresponding quantized channel of the previous pel, reconstructing a channel of the current pel based upon a lossless channel of the error vector.

15. The method of claim 10 further comprising
    for each quantized channel of the current pel that the match vector indicates does not match a corresponding quantized channel of the previous pel, reconstructing the corresponding channel of the current pel based upon a lossy channel of the error vector and one or more replacement bits.

16. The method of claim 15 further comprising dithering the one or more replacement bits.

17. A display controller comprising
    a compressor to quantize a first pel comprising a plurality of first channels to obtain a plurality of first quantized channels, to quantize a second pel comprising a plurality of second channels to obtain a plurality of second quantized channels, to generate a match vector that indicates which of the plurality of first quantized channels match the plurality of second quantized channels, generate an error vector that comprises a channel for each non-matching quantized channel of the first pel and a channel error for each matching quantized channel of the first pel, and to output a symbol comprising the match vector and the error vector, and a memory interface to transfer the symbol to a frame buffer.

18. The display controller of claim 17 further comprising video memory to store the frame buffer.

19. The display controller of claim 17 wherein the compressor discards one or more least significant bits from a plurality of first channels of the first pel, and discards one or more least significant bits from a plurality of second channels of the second pel.

20. The display controller of claim 19 wherein the compressor generates each channel error of the error vector such that the channel error comprises the one or more least significant bits discarded from a corresponding first quantized channel.

21. The display controller of claim 19 wherein the compressor generates each channel error of the error vector such that the channel error comprises a subset of the one or more least significant bits discarded from a corresponding first quantized channel.

22. The display controller of claim 17 wherein the compressor generates each channel of the error vector such that the channel comprises all bits of a corresponding first channel.

23. The display controller of claim 17 wherein the compressor generates each channel of the error vector such that the channel comprises a subset of all bits of a corresponding first channel.

24. A computer readable medium encoded with instructions capable of being executed by a computer, comprising a plurality of instructions which in response to being executed result in a computing device obtaining a symbol that represents a current pel comprising a plurality of channels, obtaining a match vector from the symbol that indicates which quantized channels of the current pel match corresponding quantized channels of a previous pel, obtaining an error vector from the symbol that indicates differences between the current pel and the previous pel, and reconstructing the current pel based upon the match vector, the error vector, and the previous pel.

25. The machine-readable medium of claim 24 wherein the plurality of instructions in response to being executed further result in the computing device determining, based upon a match flag of the match vector, whether a quantized channel of the current pel matches a corresponding quantized channel of the previous pel, and reconstructing a channel of the current pel based upon a lossless channel error of the error vector and the corresponding quantized channel of the previous pel in response to determining that the quantized channels of the current pel and the previous pel match.

26. The machine-readable medium of claim 24 wherein the plurality of instructions in response to being executed further result in the computing device determining, based upon a match flag of the match vector, whether a quantized channel of the current pel matches a corresponding quantized channel of the previous pel, and reconstructing a channel of the current pel based upon a lossy channel error of the error vector, the corresponding quantized channel of the previous pel, and one or more replacement bits in response to determining that the quantized channels of the current pel and the previous pel match.

27. The machine-readable medium of claim 26 wherein the plurality of instructions in response to being executed further result in the computing device dithering the one or more replacement bits.

28. The machine-readable medium of claim 24 wherein the plurality of instructions in response to being executed further result in the computing device determining, based upon a match flag of the match vector, whether a quantized channel of the current pel matches a corresponding quantized channel of the previous pel, and reconstructing a channel of the current pel based upon a lossless channel of the error vector in response to determining that the quantized channels of the current pel and the previous pel do not match.

29. The machine-readable medium of claim 24 wherein the plurality of instructions in response to being executed further result in the computing device determining, based upon a match flag of the match vector, whether a quantized channel of the current pel matches a corresponding quantized channel of the previous pel, and reconstructing a channel of the current pel based upon a lossy channel of the error vector and one or more replacement bits in response to determining that the quantized channels of the current pel and the previous pel do not match.

30. The machine-readable medium of claim 29 wherein the plurality of instructions in response to being executed further result in the computing device dithering the one or more replacement bits.

* * * * *